United States Patent [19]

Boyack et al.

[11] Patent Number: 4,758,625
[45] Date of Patent: Jul. 19, 1988

[54] ACRYLIC CROSSLINKED POLYMERS

[75] Inventors: Robert M. Boyack; Rama Rao; Raymond N. Timms, all of Melbourne, Australia

[73] Assignee: Albright & Wilson (Australia) Limited, Melbourne, Australia

[21] Appl. No.: 932,648

[22] PCT Filed: Feb. 4, 1986

[86] PCT No.: PCT/AU86/00027
§ 371 Date: Oct. 3, 1986
§ 102(e) Date: Oct. 3, 1986

[87] PCT Pub. No.: WO86/04591
PCT Pub. Date: Aug. 14, 1986

[30] Foreign Application Priority Data

Feb. 6, 1985 [AU] Australia .............................. PG 9173

[51] Int. Cl.$^4$ .............................................. C08G 18/30
[52] U.S. Cl. .................................... 525/123; 525/127; 525/131; 528/48; 528/75
[58] Field of Search ....................... 525/123, 127, 131; 528/48, 75

[56] References Cited

U.S. PATENT DOCUMENTS

| | | | |
|---|---|---|---|
| 3,836,491 | 9/1974 | Taft et al. | 528/49 |
| 3,874,898 | 4/1975 | McInnes et al. | 427/341 |
| 4,517,222 | 5/1985 | Blegen | 427/30 |
| 4,659,799 | 4/1987 | Nahas et al. | 527/127 |

Primary Examiner—Maurice J. Welsh
Assistant Examiner—S. A. Acquah
Attorney, Agent, or Firm—Alexis Barron

[57] ABSTRACT

A two-pot vapor curable acrylic polymer formulation which is crosslinkable with a diisocyanate crosslinking agent. The solvent used is water free and has a good evaporation rate in an acrylic urethane polymer system. The preferred acrylic polymer has a molecular weight below 10,000 and a content of 15 to 50% by weight of an hydroxy unsaturated acrylic monomer. The remaining acrylic or unsaturated monomers are selected to provide the final polymer with a glass transition temperature in the preferred range of −10° C. to 30° C. These two-pot formulations exhibit high initial hardness as well as forming tough coatings within 24 hours of curing.

20 Claims, No Drawings

ACRYLIC CROSSLINKED POLYMERS

This invention relates to surface coatings particularly to urethane crosslinked acrylic coatings.

Australian Pat. No. 476,431 discloses the vapour catalysed curing process which enables a coating of an acrylic polymer-isocyanate mix to be cured at room temperature by the use of a vapourized catalyst.

U.K. Pat. No. 2093049 provides a number of resin-/isocyanate mixtures for use in the vapour catalysed curing process. These compositions provide conventional coating formulations particularly suited for vapour catalysis. Polyester, polyether and acrylic polyols are disclosed as being useful backbone polymers for use with the isocyanate. European Pat. No. 0,029,598 discloses a coating composition having 50 to 95% of an acrylic polymer having a molecular weight from 500 to 10,000 and an hydroxyl content of at least 2% with 5 to 50% by weight of a polyisocyanate crosslinking agent.

It is an object of this invention to provide an improved composition for forming the cured acrylic-urethane coating so that the resulting coating exhibits improved toughness characteristics and has a quick drying time. Toughness is a combination of hardness and ductility or resilience which are desirable properties in coatings.

In particular it is an object of the invention to develop polymer formulations which exhibit the characteristic of early initial hardness so that the coatings are resistant to damage within half an hour of application.

To this end the present invention provides a coating composition curable with a vapourized catalyst and having high initial hardness characteristics formed by mixing a poly-isocyanate cross linking agent with an acrylic polymer in a water free solvent, having a good evaporation rate in an acrylic urethane polymer system, said acrylic polymer having a molecular weight below 20,000, preferably less than 10,000 and a content of 15 to 50% by weight of an hydroxy unsaturated monomer and the remaining monomers being selected to provide the final polymer with a glass transition temperature in the range of −40° C. to 55° C., preferably −10° C. to 30° C.

By maintaining a low molecular weight and having a relatively high number of hydroxyl groups the possibility exists for creating urethane crosslinks of length comparable to that of the acrylic backbone polymer. It is thought that it is this structure that results in a tougher coating film. Further, the predominance of these urethane linkages means that the crosslinked polymer is less soluble in the carrier solvent after curing and it is thought that this results in liberation of the solvent from the film which aids drying of the coating.

The hydroxyl containing monomer which is required to be present in the acrylic polymer comprises 15 to 50% by weight of total monomers and preferably comprises 25% to 35% by weight of total monomers. Preferably the hydroxyl containing monomer is an acrylic monomer and the most preferred monomers of this class are hydroxy ethyl acrylate (HEA), and hydroxy ethyl methacrylate (HEMA). With hydroxy ethyl acrylate the otimum initial hardness characteristics are obtained with polymers in which HEA content is within the range of 25 to 35% moles on total moles of monomer and preferably about 30 mole %. The pot life optimum of at least 12 hours can be achieved within the range of 15 to 45% HEA content. It has been found that surprisingly HEA tends to provide better initial hardness and also equal to better final hardness than HEMA when used as the principal hydroxy monomer. Hydroxypropyl acrylate (HPA) and hydroxy propyl methacrylate (HPMA) may also be used, but as they contain a high proportion of secondary alcohols, they cure more slowly. They may be used in conjunction with HEA and HEMA to extend the pot-life.

As well as the acrylic and methacrylic hydroxy monomers other hydroxy monomers may be used, preferably in admixture with acrylic or methacrylic hydroxy monomers. By using monomers which provide a longer hydroxyl terminated side chain preferably greater than 2 carbon atoms in length, the final cured urethane crosslinked polymer is thought to exhibit better flexibility characteristics in conjunction with hardness and is therefore less brittle. Suitably these other hydroxy monomers may be used up to 10% of the final polymer.

For example, one such monomer is an adduct of HEA and caprolactone. This monomer when used as a co-hydroxy monomer was found to be suitable.

Monomers prepared from poly-ethylene glycol ethers or secondary alcohol ethers such as poly-propylene glycol ethers, which give an hydroxyl terminated polyether side chain in the final polymer are also suitable in conjunction with shorter chain hydroxy acrylic or methacrylic esters. Particularly suitable are glycerol mono acrylate or poly-ethylene glycol mono methacrylate. These two monomers improve solvent resistance, flexibility and coating flow. Also suitable is poly-propylene glycol mono methacrylate, which has a long polypropylene glycol chain.

In order to ensure that the backbone polymer exhibits the basic characteristics of acrylic polymers and thus provide the desired durability, the polymer preferably contains at least 50% by weight, preferably 80% by weight, of acrylic monomers based on total monomers which will include the hydroxyl containing molecule when it is an hydroxy acrylic monomer. More preferably the acrylic content is about 80% of total monomer weight.

The selection of diluent monomers to be used in conjunction with the hydroxy containing monomer is primarily dependent on the effect of the monomers in maintaining the final polymers glass transition temperature (Tg) fall within the broad range of −40° to 55° C. The preferred Tg range for the acrylic polymers is −10° C. to +30° C. Polymers with Tg values outside of this preferred range exhibit either poor solvent resistance or poor initial hardness characteristics. For polymers in which HEA or HEMA are the principal hydroxy monomers a preferred Tg range is 0° to 20° C.

As examples of suitable diluent monomers are:
(1) Ethyl hexyl acrylate (EHA) and butyl acrylate are suitable for low Tg polymers;
(2) Isobutyl methacrylate (IBMA)-provides good initial and final hardness values over the whole Tg range with solvent resistance improving at higher contents.
(3) Lauryl methacrylate (LMA) is suitable in low quantities;
(4) Ethyl acrylate (EA) is acceptable across the whole Tg range, and at levels 20% mole and greater, on total monomers, the solvent resistance improves at the expense of pot life.
(5) Ethyl methacrylate (EMA) provides good initial cure rates but shorter pot life although solvent resistance is generally improved.

(6) Acrylamide is acceptable in low concentrations however it will reduce the pot life.

(7) Styrene provides optimum initial hardness values combined with cure rate and solvent resistance at Tg values of −10° C. to 15° C. with concentrations of 10 to 25%.

(8) Methyl Methacrylate and Butyl acrylate are the preferred diluent monomers and have a preferred Tg range of 10° C. to 20° C.

The acrylic backbone polymer may be formed by feeding the monomers to the refluxing solvent over a long period of time and using an excess of initiator to keep the molecular weight low. It is preferred that the average molecular weight of the acrylic backbone polymer be above 1000 and preferably below 10,000. In terms of viscosity it is preferred that the acrylic backbone polymer have a viscosity measured at 25° C. and 65% non volatiles, within the range 500 cP. to 5,000 cP.

Another means of reducing the chain length of the acrylic polymer is to use the addition of a chain transfer agent. By using an agent with a functional group active in crosslinking it is possible to obtain a crosslinked polymer of improved properties. Thus, a chain transfer agent with a hydroxyl functional group is preferred. However, a carboxylic functional group may also be used, but it will reduce the pot-life.

The initiator which is used in one embodiment is present in excess and may also contain a functional group, such as hydroxyl. Carboxyl functional groups may be used but they will reduce the pot-life. This means that there can be two sources of terminal functional groups for use in crosslinking, from the initiator or the chain transfer agent.

Peroxide initiators have been proposed for acrylic polymers in U.S. Pat. No. 4,075,242 (Rhum). However, the method of forming acrylic polymers as disclosed in that patent relied on the essential use of high boiling point alcohols as solvent. Such solvents are not suitable in the present invention because residual solvent will react with the isocyanate crosslinking reactants.

Most conventional initiators are suitable with tertiary butyl per-2-ethyl hexanoate (t-BPEH) being the most preferred. Other acceptable initiators are azo di-isobutyro nitrile (AIBN), benzoyl peroxide (BPO), tert-butyl per benzoate (t-BPB), di-t-butylperoxide and mixtures of these initiators.

One preferred method of this invention is to use an initiator containing an azo group and a chain transfer agent in combination to react the monomers slowly to form a low molecular weight polymer. In this method the reaction temperature is from 100° to 140° C. and the azo initiator (preferably azo di-isobutyronitrile) is present in an amount of 3 to 4% by weight of the monomers.

An alternative method of this invention is to use an initiator of the peroxide type (up to 8% by weight) with or without a chain transfer agent. These initiators are usually in the liquid form and are easier to dissolve in solvents or can be used without solvents. The temperatures required to activate these initiators are generally from 70° C. to 140° C. In some cases higher boiling solvents may be required.

Preferred solvents are aromatic hydrocarbon solvents such as "PEGASOL" R100, ester solvents such as 'Cellosolve' acetate, hexyl acetate or butyl acetate and ketone solvents such as methylethyl ketone.

A particularly preferred solvent system utilizes an acetate either alone or in conjunction with a ketone solvent. This solvent system results in a faster cure rate because the solvent is more readily liberated from the polymer.

The ratio of initiator to chain transfer agent is preferably greater than 2.5 to 1. Generally, cure rate, hardness and pot life varies little with increasing initiator to chain transfer agent ratio's but solvent resistance does increase.

The preferred chain transfer agents are thiols such as dodecylmercaptan (DDM), 3 mercapto-1,2 propanediol 2-mercaptoethanol, mercaptoacetic acid and isooctyl-3-mercaptopropionate.

In selecting solvents for preparation of the acrylic polymers and also in selecting let down solvents for the coating formulations it is important to select solvents having good evaporation rates in an acrylic urethane systems. Thus, apart from the need to have good evaporation rates the solvent needs to be immiscible with the crosslinked resin coatings so that it is forced out of the coating onto its surface to aid fast evaporation. However the evaporation rate of the solvent system should not be too fast, as there should be sufficient open time for the catalyst to enter the film.

Preferred solvents are aromatic hydrocarbon solvents such as "PEGASOL" R100, ester solvents such as 'Cellosolve' acetate, hexyl acetate or butyl acetate and ketone solvents such as methylethyl ketone. Other solvents are xylene, n-amyl acetate, propoxymethylacetate, methyl isobutyl ketone and toluene.

It is to be noted that hydroxyl solvents are not suitable.

As solvents for the coating formulations any of the solvents preferred for forming the acrylic resin may be used. The preferred solvents for the coating formulations are methyl ethyl ketone (MEK) mixing with cellosolve acetate (CA) and Butyl acetate (BA) in equal quantities or MEK, CA and xylene in equal quantities.

Examples of the acrylic backbone polymer of this invention are illustrated in the following examples.

The reference to solvent resistance is a measure of the hardness and the degree of crosslinking after 24 hours, which can be achieved when using these acrylic polymers for urethane crosslinked coatings with the aid of a vapour catalyst. The solvents used for the tests are xylene and methyl ethyl ketone.

Initial hardness is a measure of the hardness of the coating measured after completion of the vapourized catalyst curing step. Final hardness of the coatings of this invention is determined at 24 hours.

To form a coating composition from any of the exemplified acrylic polymers, they are reacted with a suitable poly isocyanate. Xylylene di-isocyanate or the saturated form of xylylene diisocyanate may be used as the crosslinking agent. Preferably trimethylol propane adducts of the xylylene di-isocyanates are used.

The trimethylol propane adducts of di-isocyanates are preferred because they are less volatile than the diisocyanates. Also biuret compounds prepared from di-isocyanates may be useful. Crosslinking agents, which are prepared from aromatic isocyanates will react faster than those prepared from aliphatic isocyanates however they are subject to greater yellowing.

Some examples of other isocyanates which may be useful, or which may be used to prepare useful polyisocyanates are:

Aliphatic and alicyclic di-isocyanates such as hexamethylene-1,6-di-isocyanate, 2,4- or 2,6-di-isocyanato-1-methylcyclohexane, tetramethylene-1,4-di-isocyanate, dicyclohexylmethane-4,4'-di-isocyanate, isophorone di-isocyanate, trimethylene-1,3-di-isocyanate, pentamethylene-1,5-di-isocyanate, dodecamethylene di-isocyanate, 1,2-di-isocyanato-cyclobutane, 2,2,4-trimethyl and 2,4,4-trimethyl-1,6-di-isocyanato hexane, dicyclohexyl-4,4'-di-isocyanate, dimer acid di-isocyanates, tetramethylxylylene di-isocyanate and alkyl esters of di-isocyanatocaproic acid containing an alkyl radical with one to eight carbon atoms.

Aromatic di-isocyanates such as toluene-2,4- and -2,6-di-isocyanate, diphenylmethane-4,4'-di-isocyanate, 3-methyldiphenylmethane-4,4'-di-isocyanate, m and p-phenylene di-isocyanates, napthalene-1,5-di-isocyanate and chlorophenylene-2,4-di-isocyanate. The polyisocyanate is usually added in approximately a 1:1 stoichiometric ratio of isocyanate group to the hydroxy group in the acrylic polymers.

Using the vapour catalysed curing process the acrylic polymer isocyanate mix is sprayed or otherwise coated onto the surfaces and then the coated surfaces are placed in a curing chamber which contains vapourized amine catalyst which speeds up the reaction between the hydroxyl groups on the acrylic polymer and the isocyanate to form urethane crosslinkages.

EXAMPLE 1

| To the reactor was added | Parts by Wt. |
|---|---|
| Butyl acetate | 10.79 |
| Dodecylmercaptan | .47 |

This mixture is heated to reflux at 120° C. and subsequently over a six-hour period there is added:

| | Parts by Wt. |
|---|---|
| Styrene | 9.37 |
| Butyl acrylate | 4.12 |
| Methyl methacrylate | 19.12 |
| Hydroxy ethyl acrylate | 12.38 |

Also, concurrently with the above addition but over an eight-hour period there is added:

| | Parts by Wt. |
|---|---|
| Butyl acetate | 10 |
| Methyl ethyl ketone | 4.81 |
| Genitron AZDN LMC (Azo di-iso butyronitrile) | 1.25 | heating is then continued for a further two hours.

The non volatile content of the resultant product is 65% w/w and its viscosity was 8500 cP. at 20° C. measured with a Brookfield LVF, S3 at 6 RPM.

The dodecylmercaptan is used as a chain transfer agent.

(Calculated theoretical Tg is +42.0° C.).

This polymer cured slowly and consequently did not have high initial hardness but did have good solvent resistance and hardness after 24 hours.

EXAMPLE 2

This example demonstrates an alternative where an excess of peroxide initiator is used.

| | Kg. |
|---|---|
| 1. Heat to 150° C. | |
| Cellosolve Acetate (Ethyleneglycolmonoethylether acetate) | 22 |
| 2. Feed the following monomers over six hours | |
| Styrene | 9.37 |
| Butylacrylate | 4.12 |
| Methyl methacrylate | 19.12 |
| Hydroxy ethyl acrylate | 12.38 |
| 3. Feed simultaneously with 2. over six hours | |
| Pegasol R-100 | 22 |
| Di-tertiarybutyl peroxide | 800 g. |
| Tertiarybutyl perbenzoate | 2.1 |

Throughout the six hour feeding time the reaction mix is held at reflux temperature.

| 4. Then feed over one hour | |
|---|---|
| Pegasol R-100 | 900 g. |
| Tertiarybutyl perbenzoate | 275 g. | and then hold at reflux temperature for a further two hours and subsequently allow to cool.

This polymer product exhibited good pot life and durability as a crosslinked film.

(Calculated theoretical Tg is +42.0° C.).

This polymer when cured did not have good initial hardness but exhibited excellent solvent resistance and hardness after 24 hours.

EXAMPLE 3

To the reaction vessel was added:

| Methyl ethyl ketone | 208.4 |
|---|---|
| Butyl acetate | 683.5 |
| Dodecylmercaptan | 19.8 |

Heat this mixture to 100° C. and subsequently add dropwise, with stirring over 4 hours, a mixture of:

| Styrene | 199.8 |
|---|---|
| n-Butyl methacrylate | 199.8 |
| n-Butyl acrylate | 992.0 |
| 2-Hydroxyethyl acrylate | 528.0 |
| tert-Butyl per-2-ethylhexanoate (a 50% solution in aliphatics) | 89.1 |

Then add dropwise over 2 h a mixture of:

| Butyl acetate | 159.9 |
|---|---|
| tert-Butyl per-2-ethylhexanoate (a 50% solution in aliphatics) | 17.6 |

Hold the solution at 100° C. for 1 h and cool.

The non-volatile content is 63.3% to 65.3% (m/m) (theoretical, 64.3%), and viscosity was 1200–1700 cP at 25° C. measured with a Brookfield LVF, S3.

(Calculated theoretical Tg of Example 3 is −28° C.)

This polymer when cured exhibited good initial hardness characteristics because of its fast curing rate but its solvent resistance was poor after 24 hours.

EXAMPLE 4

1. To the reaction vessel was added:

| Methyl ethyl ketone | 100.0 |
|---|---|
| Butyl acetate | 34.0 |
| Dodecylmercaptan | 3.7 |

2. Heat this mixture to 100° C. and add dropwise with stirring, over 4 hours, a mixture of:

| Methyl methacrylate | 87.1 |
|---|---|
| Butyl acrylate | 71.8 |
| Styrene | 54.4 |
| 2-Hydroxyethyl acrylate | 75.5 |
| Dodecylmercaptan | 3.7 |

3. Feed simultaneously with 2., over four hours, eighty percent of a mixture of:

| Tert-butyl per-2-ethyl hexanoate (50% solution in aliphatics) | 8.9 |
|---|---|
| Methyl ethyl ketone | 26.0 |

4. Add the remaining twenty percent of mixture 3., over the next two hours, then hold at reflux temperature for a further hour and allow to cool.

(Calculated theoretical Tg is +15° C.).

This polymer when cured exhibited a good cure rate and consequently also a good initial hardness and also had excellent solvent resistance after 24 hours.

EXAMPLE 5

| To the reactor was added | Parts by Wt. |
|---|---|
| Butyl acetate | 10.79 |
| Dodecylmercaptan | .47 |

This mixture is heated to reflux at 120° C. and subsequently over a six-hour period there is added:

| | Parts by Wt. |
|---|---|
| Styrene | 9.37 |
| Butyl acrylate | 14.10 |
| Methyl methacrylate | 11.31 |
| Hydroxy ethyl acrylate | 12.38 |

Also, concurrently with the above addition but over an eight-hour period there is added:

| | Parts by Wt. |
|---|---|
| Butyl acetate | 10 |
| Methyl ethyl ketone | 4.81 |
| Genitron AZDN LMC (Azo di-iso butyronitrile) | 1.25 | heating is then continued for a further two hours.

The non volatile content of the resultant product is 65.6% w/w and its viscosity was 6000 cP. at 25° C. measured with a Brookfield LVF, S3 at 6 RPM.

(Calculated theoretical Tg is +7.5° C.)

This polymer when cured exhibits both good initial hardness and good solvent resistance after 24 hours.

EXAMPLE 6

This example demonstrates an alternative where an excess of peroxide initiator is used.

| | Kg. |
|---|---|
| 1. Heat to 150° C. | |
| Cellosolve Acetate (Ethyleneglycolmonoethylether acetate) | 22 |
| 2. Feed the following monomers over six hours | |
| Styrene | 9.37 |
| Butyl acrylate | 14.10 |
| Methyl methacrylate | 11.31 |
| Hydroxy ethyl acrylate | 12.38 |
| 3. Feed simultaneously with 2. over six hours | |
| Pegasol R-100 | 22 |
| Di-tertiarybutyl peroxide | 800 g. |
| Tertiarybutyl perbenzoate | 2.1 |

Throughout the six hour feeding time the reaction mix is held at reflux temperature.

| 4. Then feed over one hour | |
|---|---|
| Pegasol R-100 | 900 g. |
| Tertiarybutyl perbenzoate | 275 g. | and then hold at reflux temperature for a further two hours and subsequently allow to cool.

This polymer product exhibited good pot life and durability as a crosslinked film.

(Calculated theoretical Tg is +7.5° C.).

This polymer when cured has a good initial hardness and solvent resistance after 24 hours.

EXAMPLE 7

1. To the reaction vessel was added:

| Methyl ethyl ketone | 36.0 |
|---|---|
| Butyl acetate | 100.0 |
| Dodecylmercaptan | 6.8 |

2. Heat this mixture to 100° C. and subsequently add dropwise, with stirring over 4 hours, a mixture of:

| Styrene | 55.2 |
|---|---|
| Methyl methacrylate | 80.9 |
| n-Butyl acrylate | 81.8 |
| 2-Hydroxyethyl acrylate | 94.3 |
| tert-Butyl per 2-ethylhexanoate (a 50% solution in aliphatics) | 13.7 |

Then add dropwise over 2 h a mixture of:

| Butyl acetate | 44.0 |
|---|---|
| tert-Butyl per-2-ethylhexanoate (a 50% solution in aliphatics) | 3.4 |

Hold the solution at 100° C. for 1 h and cool. The non-volatile content is 62.5% to 64.5% (m/m) (theoretical, 63.5%), and viscosity was 10,000 to 14,000 cP at 25° C. measured with a Brookfield LVF, S3.

(Calculated Theoretical Tg is +10° C.).

This polymer when cured has good initial hardness characteristic and also exhibits good solvent resistance and hardness after 24 hours.

The claims defining the invention are as follows:

We claim:

1. A coating composition curable with a vapourised catalyst and capable of forming a coating having high initial hardness characteristics comprising a polyisocyanate crosslinking agent, an acrylic polymer, and a water free solvent having a good evaporation rate in an acrylic urethane polymer system, said acrylic polymer having a molecular weight below 20,000, and a content of 15 to 50% by weight of an hydroxy unsaturated monomer and the remaining monomer or monomers being selected to provide the final polymer with a glass transition temperature in the range of −40° C. to +55° C.

2. A coating composition as claimed in claim 1 wherein the hydroxy monomer is an hydroxy acrylic or methacrylic monomer.

3. A coating composition as claimed in claim 2 wherein the hydroxy acrylic or methacrylic monomer is present in an amount of 25 to 35% by weight.

4. A coating composition as claimed in claim 3 wherein the hydroxy monomer is selected from hydroxy ethyl acrylate or hydroxy ethyl methacrylate.

5. A coating composition as claimed in claim 1 wherein a proportion of the hydroxy monomers provide a final polymer having pendant hydroxy terminated chains greater than 2 carbon atoms in length.

6. A coating composition as claimed in claim 4 wherein the remaining monomer or monomers are selected to give a polymer with a glass transition temperature in the range of 0° to 20° C.

7. A composition as claimed in claim 1 wherein the acrylic polymer is formed in a solvent having a good evaporation rate in an acrylic urethane polymer system in the presence of a chain transfer agent and a free radical initiator the ratio of initiatior to chain transfer agent being at least 2.5 to 1.

8. A composition as claimed in claim 1 wherein the solvent used is an acetate or a ketone.

9. A composition as claimed in claim 1 wherein the isocyanate crosslinking agent is selected from aliphatic or alicyclic di-isocyanates, aromatic di-isocyanates or trimethylol propane adducts of di-isocyanates.

10. A coating composition as claimed in claim 1 wherein said acrylic polymer has a molecular weight below 10,000.

11. A coating composition as claimed in claim 10 wherein said acrylic monomer contains at least 50% by weight of acrylic monomer or monomers.

12. A coating composition as claimed in claim 11 wherein said remaining monomer is selected from the group consisting of ethyl acrylate, butyl acrylate, ethyl hexyl acrylate, methyl methacrylate, ethyl methacrylate, butyl methacrylate, and lauryl methacrylate.

13. A coating composition as claimed in claim 1 wherein the remaining monomer or monomers are selected to give a polymer with a glass transition temperature in the range of −10° C. to +30° C.

14. A coating composition as claimed in claim 1 wherein said remaining monomer is selected from the group consisting of ethyl hexyl acrylate, butyl acrylate, isobutyl methacrylate, lauryl methacrylate, ethyl acrylate, ethyl methacrylate, acrylamide, styrene, methyl methacrylate and butyl acrylate.

15. A coating formed from the cured composition of claim 1.

16. A coating formed from the cured composition of claim 4.

17. A coating formed from the cured composition of claim 10.

18. A coating formed from the cured composition of claim 11.

19. A coating formed from the cured composition of claim 12.

20. A coating formed from the cured composition of claim 13.

* * * * *